Patented Aug. 1, 1939

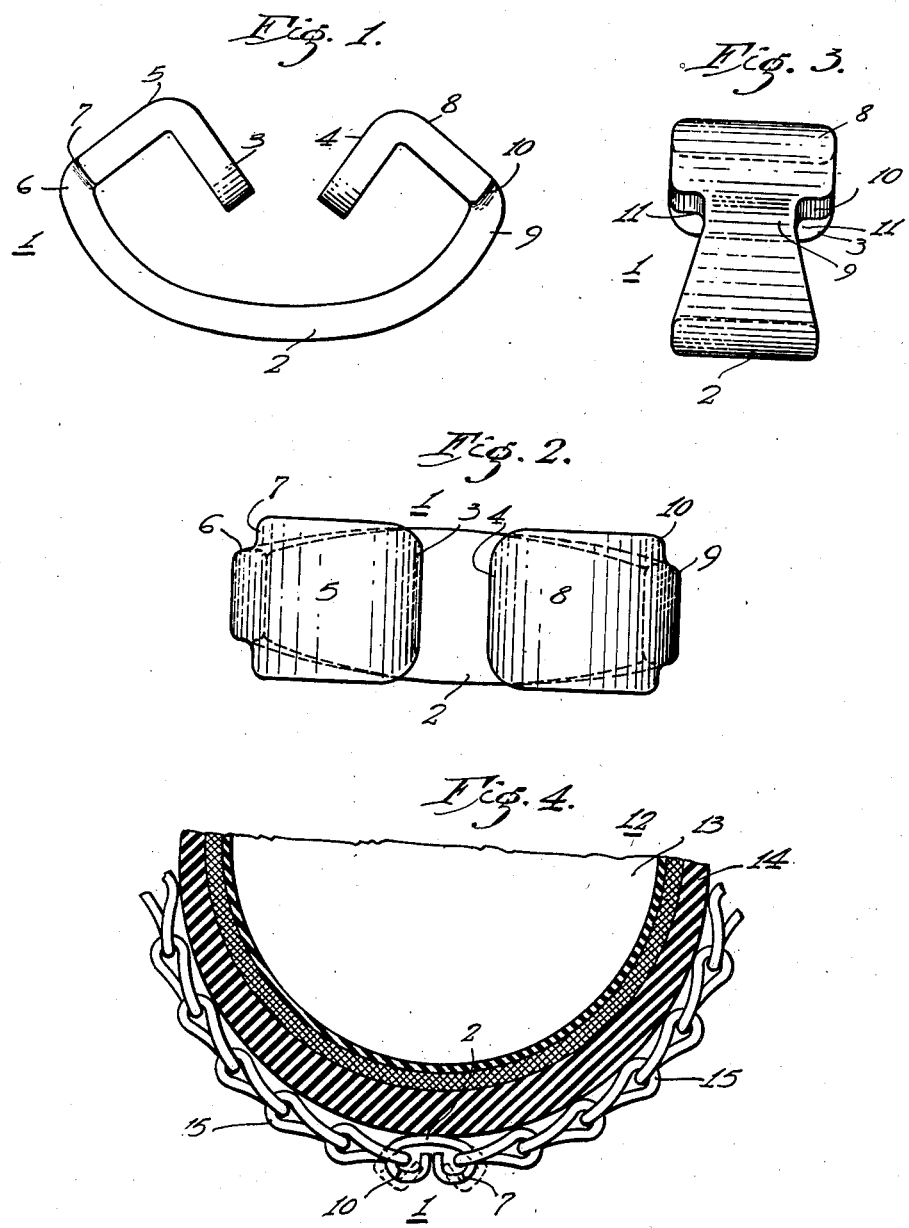

2,168,029

UNITED STATES PATENT OFFICE 2,168,029

CROSS CHAIN REPAIR LINK

Frank B. Hewel, Pittsburgh, Pa.

Application November 24, 1936, Serial No. 112,544

5 Claims. (Cl. 59—84)

My invention relates to tire chains and particularly to repair of emergency links therefor.

The breaking of cross chain links on tires when driving is always an annoyance or worse, and in most cases, in order to repair the broken chain, it is necessary to drive until the next garage is encountered, where the necessary special tools will be available to remove the broken cross chain, and to purchase a complete new cross chain. For these reasons, special repair links of various kinds, which may be used to temporarily fasten the broken ends of a cross chain together, have been used, such links being closed either by ordinary tools such as pliers or by the tire running over the link. However, since such a repair link must necessarily be made of soft metal in order to permit this manipulation, all such links in the prior art could, by reason of their physical nature, be straightened out under tension applied when driving over them and the repair link thus lost, which again causes the previous trouble of a broken chain.

One object of my invention, therefore, is to prevent a repair link of the character set forth from being separated or pulled off the remainder of the cross chain, so that once the link is put on, it will stay on until actually worn out in operation or deliberately replaced.

Another object of my invention is to provide a repair link of such structure as to maintain the cross chain ends together, since the link cannot be straightened out and detached and will be as strong as the shearing strength of the material.

A further object of my invention is to provide projections or shoulders on the sides of a repair link of the type set forth to so engage the adjacent cross chain links as to physically prevent straightening out and detaching of the repair link.

Other objects of my invention will become evident from the following detailed description taken in conjunction with the accompanying drawing, wherein:

Figure 1 is a view in side elevation of a repair link constructed in accordance with my present invention, the link being shown in its open or attachable position;

Fig. 2 and Fig. 3 are, respectively, top plan views and end views of the repair link shown in Fig. 1; and Fig. 4 is a partial sectional view of an automobile tire and wheel to which a cross chain having one of my repair links associated therewith is attached.

Referring to the drawing, the structure here shown comprises a link 1 of suitable strip form having a central, slightly-curved body portion 2, two intermediate portions 5 and 8 and two end portions 3 and 4 which converge inwardly toward each other at an angle of approximately 90 degrees and are sufficiently spaced apart as to permit of ready insertion of the ends 3 and 4 in the adjacent cross chain links. The end portion 3 is preferably integrally attached to intermediate portion 5 extending at substantially right angles thereto and terminating in two shoulders 7, a narrowed or tapered section 6 serving to connect the central body portion 2 with the portion 5 between the shoulders 7.

Similarly, intermediate portion 8 extends at substantially right angles to the other end portion 4, terminating in shoulders 10 and integrally associated with a tapered or narrowed section 9. Thus a plurality of cut-out portions 11 are provided at each side or end of my repair link.

The method of attaching and the self-closing operation of my repair link 1 will be evident from an inspection of Fig. 4 in which the link 1 is shown as attached to two similar adjacent cross chain links of the ordinary twisted and closed variety, my open repair link interconnecting the adjacent cross chain links by having the ends 3 and 4 inserted through the adjacent links respectively. Initially, the repair link will occupy the position shown in dotted lines in Fig. 4, corresponding to Fig. 1. While the end portions of the repair link could then be readily pressed into the final position shown in solid lines in Fig. 4, nevertheless it is unnecessary to make this extra exertion, as the first time that the tire runs over the chain and repair link, the ends will be folded into the final or closed position shown in solid lines in Fig. 4.

In this way, an emergency repair job may be readily made on the road and the broken cross chain again put into service.

However, other repair links of this general character have been made out of wire or continuous-width bar or strip material, so that, in the case of heavy tension on the repair link during operation of the automobile, the repair link has again straightened out, since it is necessarily made of relatively soft metal and has become detached and lost, so that it was again necessary to make some sort of repair or drive on until the next garage was encountered.

In the case of my repair link, however, this straightening out and loss of the repair link are absolutely precluded by reason of the provision of the shoulders 7 and 10, cut-out portions 11, or similar means, which in the case of any tendency of the repair link 1 to straighten out, lockingly engage the adjacent cross chain links and thus prevent further straightening out or detachment of the repair link, since it would be necessary to shear the repair link before detachment of the ends of the cross chain links could be effected.

It will be seen that I have thus provided a repair or emergency link for tire chains which is not only simple and rugged in construction, inexpensive and readily applied, but which, after being once attached in place, remains there and cannot be accidentally detached or lost, since it is mechanically interlocked in position.

I do not wish to be restricted to the specific structural details or arrangement of parts herein set forth, as various modifications thereof may be effected without departing from the spirit and scope of my invention. I desire, therefore, that only such limitations shall be imposed thereon as are indicated by the appended claims.

I claim as my invention:

1. As an article of manufacture, a strip-form link for chains having smooth intermediate edges and substantially oppositely disposed notches between each of said edges and each end of the link, said ends being non-overlapping and disposed in substantial alinement.

2. A tire cross-chain comprising a plurality of closed links having a gap at one point and a permanently open link interconnecting the closed links on opposite sides of said gap and having end portions of greater width than the associated openings in said closed links, the portions adjacent said end portions being materially narrower and the entire portions between said end portions having uninterrupted edges.

3. A tire cross-chain comprising a plurality of closed links having a gap at one point and a permanently open link interconnecting the closed links on opposite sides of said gap and having oppositely located shoulders near each end, the total width of said open link across each pair of said shoulders being greater than the cooperating openings in said closed links thereby to preclude said open link when in closed operative position from being pulled out of said closed links, and the longitudinal edges of said open link between the shoulders at each end being smooth.

4. As an article of manufacture, a strip-form link for chains having a plurality of shoulders on each side thereof and having inturned confronting ends, the link being of uniform thickness throughout its length, the longitudinal edges between the shoulders on each side being uninterrupted and merging into said shoulders at each of said ends.

5. A link for tire chains of strip form, one end of the link having two spaced bends in a clockwise direction and the other end having two spaced bends in a counter-clockwise direction to cause said ends to confront each other, the body portion between said ends having a smooth contour and being symmetrically narrowed at and near the line of juncture with each of said ends to provide interlocking shoulders.

FRANK B. HEWEL.